UNITED STATES PATENT OFFICE.

ERICH EBLER, OF HEIDELBERG, GERMANY.

MANUFACTURE, ISOLATION, AND ENRICHMENT OF RADIO-ACTIVE SUBSTANCES BY ADSORPTION FROM SOLUTIONS.

1,142,153. Specification of Letters Patent. Patented June 8, 1915.

No Drawing. Application filed December 8, 1913. Serial No. 805,406.

*To all whom it may concern:*

Be it known that I, Dr. ERICH EBLER, a citizen of the German Empire, residing at Heidelberg, Baden, Germany, have invented certain new and useful Improvements in the Manufacture, Isolation, and Enrichment of Radio-Active Substances by Adsorption from Solutions, of which the following is a specification.

This invention relates to the manufacture, isolation and enrichment of radium and of other radioactive substances by adsorption from solutions and consists in the use of precipitated hydrated peroxid of manganese for this purpose. The gel of the hydrated peroxid of manganese is a valuable adsorptive material as it has higher adsorptive property for radium than for barium if both these substances are at the same time present in the solution. Thus the use of hydrated peroxid of manganese allows obtaining of radioactive barium containing salts which are comparatively rich in radium.

The radioactive compound adsorbed by the hydrated peroxid of manganese can easily be obtained in dissolved condition by treating the adsorptive material with hot hydrochloric acid, and from this solution pure radioactive salt enriched in radium can be obtained by introducing hydrochloric acid gas or concentrated hydrochloric acid or nitric acid into the solution and separating the deposit from the solution.

If this process is used in connection with solutions of radium-barium salts it is possible by repeating the process to enrich more and more the radium compared with the barium. The manganese salt resulting from the process can be regenerated to peroxid of manganese for repeated use. Besides saving in reacting material this regenerating process is advantageous in so far as small portions of radium which may not be dissolved by hydrochloric acid are returned into the process and are saved thereby from being lost. The regeneration of the hydrated peroxid of manganese from the solutions resulting from the precipitating process of the radium-barium salt is preferably effected by bringing said solutions in to reaction with permanganates. This may be effected for instance by producing the hydrated peroxid of manganese in the radium solution itself by precipitation. For this purpose the permanganates are treated with reducing agents such as methyl alcohol, oxalic acid, etc., and especially with chlorid of manganese which may be used with advantage. Preferably the permanganates are added to the radium salt solution and thereafter, at raised temperature, under stirring, the reducing substances, preferably chlorid of manganese are added.

It has been found as a rule that 1 molecule of hydrated peroxid of manganese is capable of adsorbing 1/10 to 1/4 molecule of barium salt. It has furthermore been found that in connection with various radium-barium sesqui-chlorids containing from $10^{-7}\%$ to $10^{-2}\%$ radium, in using a quantity of hydrated peroxid of manganese adapted to adsorb 20% to 40% of the barium in accordance with the above rule, that then always 80% to 100% of the radium were adsorbed. Therefore if hydrated peroxid of manganese is used in such quantity that 40% of the barium present in the solution under treatment are adsorbed together with the whole quantity of radium it is possible to reduce the contents in barium to about 1/10000 of its original value by repeating the adsorption process ten times. Herein resides the great advantage of the hydrated peroxid of manganese as adsorptive reagent for radium. A further advantage resides therein that besides the hydrated peroxid of manganese only small quantities of cheap materials are used and that only one and the same operation is to be repeated, with the effect that only devices of great simplicity are required.

The following examples show how the invention may be carried out.

Example 1: 1 part by weight of radium-barium-chlorid is dissolved in about 16 parts by weight of water and this solution is shaken or stirred for some time (1/2 to 3 hours) with a quantity of moist precipitated hydrated peroxid of manganese which corresponds to 5 to 8 parts by weight of $MnO_2$. Thereafter the liquid is decanted and the precipitate of peroxid of manganese washed with water and filtered. The paste of hydrated peroxid obtained in this way is dissolved in hot hydrochloric acid and after cooling hydrochloric acid gas is introduced into the solution. The effect of such gas treatment is the precipitation of about 1/3 part by weight of radium-barium-chlorid which is further treated according to the same rule.

From the solution which is filtered off from the radium-barium-chlorid, chlorid of manganese is obtained by evaporating. 30 parts of such chlorid of manganese dissolved in 100 parts of water are combined with 16 parts of permanganate dissolved in 500 parts of water. There results a precipitate which is filtered off and washed out which consists of hydrated peroxid of manganese which may be used for further absorptive operations and which returns into the process the traces of radium which may not have been precipitated as radium-barium-chlorid.

Example 2: 10 parts by weight of radium-barium-chlorid are dissolved in about 160 parts by weight of water and in such solution thereafter about 20 to 40 parts by weight of permanganate of potassium are dissolved. To such mixture 6 to 24 parts by weight of methyl alcohol are added at a temperature of 50° to 90° C. under constant stirring. The liquid is then warmed for some time till the whole of the hydrated peroxid of manganese is precipitated. Instead of the methyl alcohol another reducing agent, especially chlorid of manganese, may be used in equivalent quantity, with exception of such reducing agents as contain or are able to form sulfuric acid. If a reducing agent such as chlorid of manganese is used, which in reaction with permanganate sets free acid, the formed free acid must be neutralized by the addition of alkali. The precipitated peroxid of manganese is decanted and washed out with water and is then dissolved in hot hydrochloric acid, and from this solution enriched radium-barium salt is obtained by introducing hydrochloric acid gas into the cold solution. About 4 parts by weight of radium-barium chlorid are obtained which are further treated in accordance with the same rule. The remaining lyes of chlorid of manganese can be regenerated to peroxid of manganese as explained in Example 1 or to permanganate according to known methods, or they can be used as described just above for direct precipitation of the grey oxid of manganese from radium solutions.

What I claim is:

1. Process of producing, isolating and enriching radioactive compounds by adsorption from solutions containing them comprising treating said solutions with hydrated peroxid of manganese containing material, separating the solution from the solid substance therein, treating said solid material with solvents for the radioactive substance adsorbed by the peroxid of manganese material and separating the radioactive solution from the manganese material.

2. Process of producing, isolating and enriching radioactive compounds by adsorption from solutions containing them comprising treating said solutions with hydrated peroxid of manganese containing material, separating the solution from the solid substance therein, treating said solid material with solvents for the radioactive substance adsorbed by the peroxid of manganese material and separating the radioactive solution from the manganese material and repeating the process till the desired enrichment of radium is reached.

3. Process of producing, isolating and enriching radioactive compounds by adsorption from solutions containing them comprising treating said solutions with hydrated peroxid of manganese, separating the solution from the solid substance therein, treating said solid material with solvents for the radioactive substance adsorbed by the peroxid of manganese material and separating the radioactive solution from the manganese material.

4. Process of producing, isolating and enriching radioactive compounds by adsorption from solutions containing them comprising treating said solutions with substances adapted to produce hydrated peroxid of manganese within the solutions, separating the solution from the solid substance so produced therein, treating said solid material with solvents for the radioactive substance adsorbed by the peroxid of manganese material and separating the radioactive solution from the manganese material.

5. Process of producing, isolating and enriching radioactive compounds by adsorption from solutions containing them comprising treating said solutions with permanganates in combination with reducing substances, separating the solution from the solid substance so produced therein, treating said solid material with solvents for the radioactive substance adsorbed by the peroxid of manganese material and separating the radioactive solution from the manganese material.

6. Process of producing, isolating and enriching radioactive compounds by adsorption from solutions containing them comprising treating said solutions with permanganates in combination with chlorid of manganese, separating the solution from the solid substance so produced therein, treating said solid material with solvents for the radioactive substance adsorbed by the peroxid of manganese material and separating the radioactive solution from the manganese material.

7. Process of producing, isolating and enriching radioactive compounds by adsorption from solutions containing them consisting in bringing the radioactive substance contained within the solution to adsorption on hydrated peroxid of manganese, separating the adsorption combination from the solution, treating the adsorption combination
5 with hot hydrochloric acid, introducing hydrochloric gas into the solution and separating the precipitate from the liquid.

In testimony whereof I affix my signature in presence of two witnesses.

Dr. ERICH EBLER.

Witnesses:
 Fritz Hess,
 S. S. Berger.